(12) United States Patent
Martin et al.

(10) Patent No.: US 6,958,460 B2
(45) Date of Patent: Oct. 25, 2005

(54) DEVICE FOR MACHINING BY ELECTROEROSION

(75) Inventors: Roland Martin, Dingy-en-Vuache (FR); Sebastian Dorthe, Chesalles sur Oron (CH); Maurizio Tognolini, Bassins (CH)

(73) Assignee: Charmilles Technologies S.A., Meyrin-Geneve (CH)

( * ) Notice: Subject to any disclaimer, the term of this patent is extended or adjusted under 35 U.S.C. 154(b) by 138 days.

(21) Appl. No.: 10/419,788

(22) Filed: Apr. 22, 2003

(65) Prior Publication Data

US 2003/0222052 A1     Dec. 4, 2003

(30) Foreign Application Priority Data

Jun. 3, 2002   (EP)  .................................... 02012169

(51) Int. Cl.[7] .............................. B23H 1/02; B23H 7/14
(52) U.S. Cl. .................... 219/69.13; 219/69.18
(58) Field of Search ........................... 219/69.13, 69.18

(56) References Cited

U.S. PATENT DOCUMENTS 3,832,510 A    8/1974   Pfau et al.
6,107,593 A  *  8/2000   Tsai et al. ................ 219/69.13
6,130,510 A  * 10/2000   Kurihara et al. ............ 315/225
6,140,600 A  * 10/2000   Kaneko et al. .......... 219/69.13
6,392,183 B1    5/2002   Martin et al.

FOREIGN PATENT DOCUMENTS

| JP | 60-180720   |   | 9/1985 |
| JP | 01-153220   |   | 6/1989 |
| JP |  1-153220 A | * | 6/1989 |
| JP | 60-180720 A | * | 9/1995 |

* cited by examiner

Primary Examiner—Geoffrey S. Evans
(74) Attorney, Agent, or Firm—Young & Thompson (57) ABSTRACT

The device for machining by electroerosion comprises an electrode-tool (EO) and an electrode-workpiece (EP) constituting the opposite poles of a working gap (GA) and an electrical circuit with a double voltage source (UD) connected to a supply network (A) arranged so as to produce erosive discharges between the electrode-tool (EO) and the electrode-workpiece (EP). This double voltage source (UD) comprises a first (U1) and a second (U2) voltage source connected galvanically to each other by their poles. This double source (UD) is connected to the working gap by at least four separate branches (B1 to B4) of which at least one comprises a self-induction element (LL, LL). Switching elements (SW1, SW2) permit producing by selective connection of the branches at least two increasing current slopes and at least two decreasing current slopes.

9 Claims, 5 Drawing Sheets

DEVICE FOR MACHINING BY ELECTROEROSION

BACKGROUND OF THE INVENTION

The present invention relates to a device for machining by electroerosion, comprising an electrical circuit with a voltage source connected to a supply network, arranged so as to produce current pulses in the load circuit comprising an electrode-tool and an electrode-workpiece constituting the opposite poles of a working gap in series with at least one self-induction element.

DESCRIPTION OF THE RELATED ART

Such devices are generally used for electroerosion by penetration, by wire or by electroerosive milling. However, it is generally necessary to have a generator of different erosive discharges for each application or type of electroerosion.

SUMMARY OF THE INVENTION

One of the objects of the present invention is to provide a device comprising the simplest possible architecture and at the same time adapted to cover all the machining applications. Such a device should permit industrialization at lowest cost whilst being applicable to machining by penetration, by wire or by milling.

The device will moreover be adapted to be able to produce electroerosive discharges whose current development as a function of time can be controlled precisely, which can thus comprise a succession of different inclinations of rising and falling of current. Thus, the wear of the electrode-tool can be decreased optimally in the case of machining by penetration.

Another object that the device should achieve is the suppression of dissipation by the resistance of ballast of energy to store temporarily in the self-inductance loops. It is desirable to eliminate these complex and costly ballast resistances; thus it is often necessary to provide several values of switchable resistances, because the energy source to be dissipated has not always a fixed voltage.

Another object of the invention is to avoid causing large continuous currents to circulate in the storage loops during the phases of pause and standby of the discharges.

These various objects are achieved by the fact that the electrical circuit comprises the combination of the following characteristics:
- a double voltage source comprising a first and a second voltage source connected galvanically together at one of their poles,
- said double source being connected to the load circuit by at least four separate branches,
- switching means to produce by the selected branch of said branches at least two slopes of increasing current and at least two slopes of decreasing current,
- said branches being arranged such that the excess self-induction energy of the electrical circuit not consumed by the erosive discharges will be returned to the double source,
- transfer means being provided to carry out an energy transfer between the two voltage sources of the double source.

Thanks to these characteristics, the device can be used for any type of electro-erosion by penetration, by wire, by milling etc. By penetration, the device renders possible machining with very little wear of the electrode-tool because the slopes of increase and decrease of the current of the electrical impulses can be programmed and controlled. This control permits giving to the current impulses an overall profile corresponding to each machining application.

Each of the two sources can function as a principal branched source of the network or of the secondary source receiving the loads either by return of the current from the working gap and the line inductance, or by the action of transfer means acting as a current pump.

The electrical energy supplied by the network to the device is entirely devoted to machining by electroerosion and the excess energy during stopping of the electrical pulses is returned to one or the other of the two sources, which permits a particularly rational operation under all conditions of use, hence considerable savings of energy.

No current flows in the principal electrical circuit for the production of discharges, during periods of pause and standby.

The current pump serves at the same time as a voltage regulator for the auxiliary source that is not connected to the network and permits in particular adjusting this voltage in real time to the particular conditions of machining desired.

Preferably, the device comprises means to connect either the first or the second voltage source to the supply network.

These means which are constituted by a single or double switch, permit rapid adaptation of the device to a different application.

A preferred embodiment is characterized by the fact that the electrical circuit is of general half-bridge construction comprising,
- a first branch connecting a positive pole of the double source by a first switch to the working gap,
- a second branch connecting the working gap by a second switch to a negative pole of the double source,
- a third branch connecting by means of a first unidirectional element the double source to a first terminal of the first switch directed to the side of the working gap,
- a fourth branch connecting, by means of a second unidirectional element, a first terminal of the second switch directed to the side of the working gap, to the double source.

This general architecture of the electrical circuit renders possible easily obtaining two slopes of increase of current and two slopes of decrease of current permitting, by given sequencing of the different current slopes, the creation of different current impulse profiles.

Preferably, the first and second voltage sources are connected to each other by their poles of the same polarity, forming a common pole.

The two sources thus have a common potential, which permits branching to the network with simple switching between the two sources.

Advantageously, one pole of the second source not connected to the first source is connected by means of one of the unidirectional elements to the first terminal of the switch whose other terminal is connected to the common pole of the two sources, to form said third or fourth branch.

According to another very advantageous embodiment, one pole of the second source not connected to the first source is connected by means of one of the unidirectional elements to the first terminal of the switch of which one second terminal is connected to the pole of the first source which is not common to the second source, to form said third or fourth branch.

A supplemental embodiment is characterized by the fact that the first and second sources are connected to each other by their poles of opposite polarity, and by the fact that the second source is connected in series in the first or second branch to a second terminal of one of the switches directed toward the first source.

These three embodiments principally differ from each other by the connection of the second source. Although they permit all three obtaining at least four different current slopes, these slopes are obtained in a different manner, as is also the recovery of the excess energy in one or the other of the two sources.

Preferably, said transfer means comprise a first transfer circuit arranged to transfer the energy of the second source to the first source and by the fact that this first transfer circuit comprises, on the one hand, a first current mesh comprised by an energy accumulator, a third switch, and the second source, and, on the other hand, a second current mesh comprising at least said energy accumulator, a third unidirectional element and the first source mounted as an energy receiver, the first and second meshes being actuated alternatively by a closing and opening of the third switch.

There is obtained by these characteristics a unidirectional pump having a very simple structure with only three electronic components. This pump permits transferring charges from the second to the first source and this independently of the operation of the impulse generator circuit properly so called.

Preferably, said transfer means comprise a second transfer circuit arranged to transfer the energy from the first source toward the second source and by the fact that this second transfer circuit comprises, on the one hand, a third current mesh comprising at least one energy accumulator, a fourth switch and the first source and, on the other hand, a fourth current mesh comprised by said energy accumulator, a fourth unidirectional element and the second source mounted as an energy receiver, the third and fourth meshes being actuated alternatively by the opening and closing of the fourth switch.

The energy accumulator, for example a self-induction coil, can be common to the first and second transfer circuits, which permits obtaining a bi-directional pump with only five electronic components.

Other advantages will become apparent from the characteristics set forth in the dependent claims and in the description describing hereafter the invention in greater detail with the help of drawings which are schematic and exemplary of the embodiments and modifications.

DESCRIPTION OF THE PREFERRED EMBODIMENTS

Figure 1:
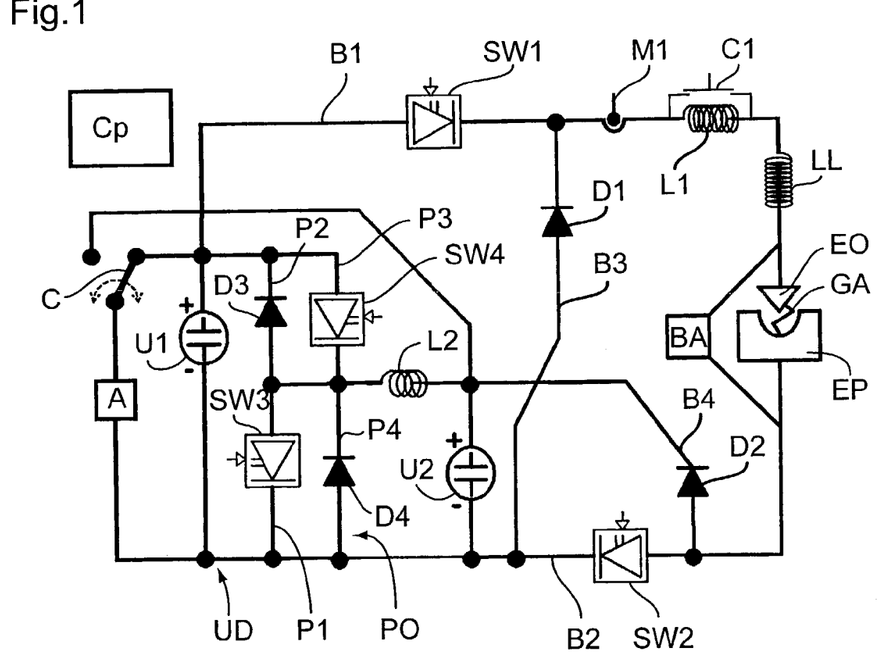
FIG. 1 shows the schematic electrical circuit of a first embodiment.

A first embodiment of the machining device by electro-erosion or electroerosive impulse generator, is shown in FIG. 1 and has a first voltage source member U1, hereinafter called a primary source, and a second voltage source member U2, hereafter second source, forming together a double voltage source UD. The two voltage sources U1 and U2 are connected galvanically together at one of their poles, in this case the two negative poles, to constitute the double voltage source. By means of a switch C, one or the other of the two voltage sources can be connected to an electrical supply A, such as a voltage stabilized supply connected to the electrical network and comprising at least one transformer and one rectifier.

The generator has four connection paths or branches between the double source UD and the gap GA located between the electrode tool EO and the electrode-workpiece EP to be machined.

A first branch B1 comprises, from the positive terminal of the first source U1, a switch SW1, an ammeter M1 and a self-induction coil L1 whose terminals are connected in shunt by a switch C1, LL representing the parasitic inductance of the generator line.

A second branch B2, connects the electrode piece EP by a second switch SW2, to the negative terminals of the two sources U1, U2.

A third branch B3 connects the negative terminals of the two sources U1 and U2 by a diode D1, the ammeter M1, the coil L1 with its shunt C1, to the electrode tool EO.

Finally, a fourth branch B4 comprises a second diode D2 located between the electrode-workpiece EP and the positive terminal of the second voltage source U2.

These different branches in combination with the switching means constituted by the two switches SW1 and SW2 permit producing two different increasing current slopes and two different decreasing current slopes, namely slopes corresponding to the following paths:

No. 1) rapid increase: U1, SW1, M1, L(=L1+LL), GA, SW2.

The following equations are applicable:

$$UL = L \cdot di/dt = U1 - Ug \tag{1a}$$

in which

L=combined inductance of the coil L1 and the line LL, L=L1+LL;

UL=potential difference at the terminals of the combined inductance;

Ug=potential difference at the gap terminals;

U1=voltage at the terminals of the first source.

$$di/dt = (U1 - Ug)/L \tag{1b}$$

No. 2) slow increase: U1, SW1, M1, L, GA, D2, –U2, (SW2 being blocked).

The following equations are applicable:

$$UL = L \cdot di/dt = U1 - U2 - Ug \tag{2a}$$

U2=voltage at the terminals of the second source $$di/dt = (U1 - U2 - Ug)/L \tag{2b}$$

No. 3) rapid decrease: L, GA, D2, –U2, D1, M1 (SW1 and SW2 being blocked).

The following equations are applicable:

$$UL = L \cdot di/dt = -US - Ug \tag{3a}$$

$$di/dt = (-U2 - Ug)/L \tag{3b}$$

No. 4) slow decrease: L, GA, SW2, D1, M1 (SW1 being blocked).

The following equations are applicable:

$$UL = L \cdot di/dt = -Ug \tag{4a}$$

$$di/dt = -Ug/L \tag{4b}$$

It is to be noted in the case of FIG. 1 that the source U2 receives the energy from the source U1 during slow increase 2 and also receives excess inductance energy of the circuit, not consumed by the erosive discharges during rapid current decrease No. 3.

The generator shown in FIG. 1 moreover comprises transfer means to transfer energy between the two sources U1 and U2 of the double source, commonly designated current pump PO. This current pump is in the case of FIG. 1 bidirectional, thus permitting sending electric charges from the source U2 to the source U1 and vice versa. It comprises for this purpose a first transfer circuit with a first loop P1 comprising a winding L2 connected to the positive terminal of the source U2 and connected to a unidirectional switch SW3 whose output is connected to the negative terminal of the source U2, and with a second loop P2 comprising the winding L2 and a diode D3 connected to the positive terminal of the source U1 whose negative terminal is galvanically connected to the negative terminal of the source U2. By alternatively actuating the loops P1 and P2 by opening and closing the switch SW3 with a predetermined frequency, for example 200 KHZ, the charges are transferred from the source U2 to the winding L2, and then to the source U1.

Conversely, this pump comprises a second transfer circuit with a third loop P3 comprising a unidirectional switch SW4 connected to the positive terminal of the source U1 and to the winding L2 and with a fourth loop P4 having a diode D4 connected to the negative terminal of the source U2 and the winding L2.

By activating alternatively the switch SW4, the switch SW3 being blocked, the charges are transferred from the source U1 toward the source U2 by means of the winding L2.

An electronic control unit CP made according to known digital techniques, assumes a series of logical tasks, in particular controlling the opening and closing of the different switches SW1, SW2, SW3 and SW4 and the commutators C and C1. It receives among other things measurement signals from the ammeter M1 and from potentiometers, not shown, permitting measuring the voltage of the sources U1 and U2 and the potential across the gap GA.

The generator comprises moreover a trigger circuit BA branched in parallel between the electrode-tool and the electrode-workpiece and adapted to create a sufficiently high voltage across the gap that the electrical discharge will be triggered under the control of the control unit CP.

Thus the described generator has numerous particularities and advantages.

Each of the two sources can operate as the principal source or the secondary source according to the branching to the supply A. The secondary source does not receive its charges directly from the network. It is charged either by the current return from the gap and the line inductance, or by the action of the current pump.

It is important that only one source, called the principal source, be branched to the network. It is toward this that all the excess energy is returned. Because of the principle of conservation of energy, this principal source does not receive by return more energy than is delivered from the network. Accordingly, its voltage will not exceed the peak voltage of the supply.

On the contrary, if each of the two sources were connected to the network, it would be necessary to dissipate as the case may be the excess energy returned with the help of resistive ballasts. This would result in a loss of energy producing useless heating of the device and on the other hand a structure more costly in material.

The electrical energies furnished by the supply to the generator is entirely devoted, except for losses, to machining by electroerosion. The ohmic losses remain negligible, given that the proposed circuit does not comprise in principle any resistive component.

No current will circulate in the principal circuit during standby periods TD of a discharge or pause TB between two discharges. During these periods, current can circulate only momentarily in the branches of the pump PO. However, if the standby periods or pause periods are prolonged, all the current will cease flowing, because the excess energy will end up rapidly being stored in the capacitances of the sources U1 and U2.

The proposed circuit does not store electrical energy permanently in the self-inductance loops, thereby avoiding permanent losses by the Joule effect.

With a given value of self-induction in the branches of the gap, the switching means of the circuit produce two slopes of increase and two slopes of decrease of the current. Either a slow increase, a rapid increase, a slow decrease and a rapid decrease.

These four current slopes can preferably be combined sequentially in any manner. This permits giving to the current impulses an overall profile corresponding to each application.

It is moreover possible to activate the difference of the voltages of the two sources. This particularity gives a particular advantage when machining by penetration. In this type of machining, it is usual to apply a slow increase of current after striking the erosive spark, so as to reduce wear on the electrode.

In the case of the circuit of FIG. 1, the decreasing slope of current at the end of erosive discharge is the more rapid the slower is the increase at the beginning of discharge, and conversely, as can be seen from Equations 2b and 3b.

For current discharges whose rising flank is particularly slow, this permits saving time to start the following cycle, because the descending flank is shortened.

As explained above, the auxiliary source does not receive charges directly from the supply or the network, but charges itself either by the return of current from the gap and the line inductance, or by action of the current pump.

The operation of the impulse generating circuit properly so called and the operation of the pump are independent. The operation of the pump does not interfere with the operation of the impulse generator. The operations of each can be described separately.

The current pump serves at the same time to regulate the voltage for the auxiliary source that is not connected to the network. The principal source being connected to the supply, its voltage is thus defined by the peak voltage at the output of the supply. The current pump thus permits in particular to adjust in real time to the particular conditions of machining, the voltage of the source not connected to the supply.

One or the other source can be connected to the supply, the current pump remaining connected in an identical manner. There are thus obtained specific supplemental operations.

In a usual case for a machine for erosion by immersion, the supply gives a peak voltage at the output of 40 volts for example. For a typical immersion application, the source U1 will be connected to the supply. The capacitance of U1 will thus be charged at 40 volts. The capacitance of U2 remains empty upon startup of the unit. Triggering the discharges is effected by the well known triggering circuit BA connected in parallel to the gap.

Upon first triggering, the first ascending current ramp is obtained by making SW1 conductive and by locking SW2. The current follows path No. 2, slow increase, namely U1, SW1, M1, L, GA, D2, −U2 and begins to charge U2.

When the current measured by M1 reaches the maximum reference value, SW2 remaining conductive, SW1 is locked; the current decreases slowly following path No. 4, slow decrease, namely L, GA, SW2, D1, M1.

To maintain an approximately constant level of current, paths No. 2 and No. 4 are switched alternatingly according to a well-known sawtooth pattern.

When the time of interrupting the erosive discharge has arrived, SW1 and SW2 are locked and the current in the gap begins a rapid descending ramp by following the path No. 3, namely L, GA, D2, −U2, D1, M1.

Finally, when SW1 and SW2 are rendered conductive, there is produced a rapidly increasing ramp up of the current, along path No. 1 (U1, SW1, M1, L, GA, SW2) which can be used, followed by path No. 3, at the beginning of discharge and in the case of a short circuit so as to produce an anti-short circuit effect.

By following paths No. 3 and No. 2, the current charges the initially empty source U2. After about 100 erosive discharges, U2 is charged at a regulated value of voltage, for example 15 volts, that the current pump (L2, D3, SW3) will maintain by expelling the excess charges toward the source U1; this by alternatively switching the current paths P1 and P2.

As soon as the source U2 is charged to a regulated voltage of 15 volts, it becomes possible to produce very slowly increasing current ramps when path No. 2 is activated. Thus, the resulting electromotive force applied to the gap is no more than 25 volts.

It is to be noted here that if the switch SW3 is continuously locked, the source U1 being connected to the supply network A by the commutator C, the current pump remains inoperative and the auxiliary source U2 rises to the voltage of the principal source U1, thereby restoring the operation of a conventional circuit called a half-bridge circuit and comprising only a single source.

In the other mode of connection of FIG. 1, the source U2 is connected to the network. In this case, the current pump (L2, D3, SW3) can cause the voltage of the source U1 to rise to a value as high as the components permit. For example greater than 300 V. Such a control is typical of machining by cutting electroerosion with a wire, wherein there are produced triangular or trapezoidal impulses with very steep slopes.

It will thus be seen that the proposed circuit models permit each to cover all the applications of electroerosion.

The switches or static contactors are semiconductors switchable to open and close, such as Mosfet, bipolar transistors, IGBT (ignition gate bipolar transistor), GTO (gate turn off), etc.

The source voltages currently used for penetrating range from 20 volts to 80 volts, 60 volts to 500 volts for machining by wire.

The sources are essentially constituted by a capacitance ranging from 200 to 5000 Micro-farads.

The so-called principal source is not in principle regulated, its voltage is fixed by the peak voltage at the output of the rectifier bridge of supply A.

The secondary source comprises a potentiometer (not shown in the drawings): it is regulated by the current pump as a function of the cyclic ratio of opening/closing of the switch and of the frequency of commutation.

The line inductance LL is of the order of 0.5 to 3 Micro-Henry. In series with this inductance can be connected an additional self-induction coil L1, for example 5 to 20 Micro-Henry to generate slow increase current ramps in the penetration mode, the value of 20 $\mu$H being reserved for low values of discharge current so as to reduce the amplitude of oscillation of the current when the reference value is reached.

Figure 2:
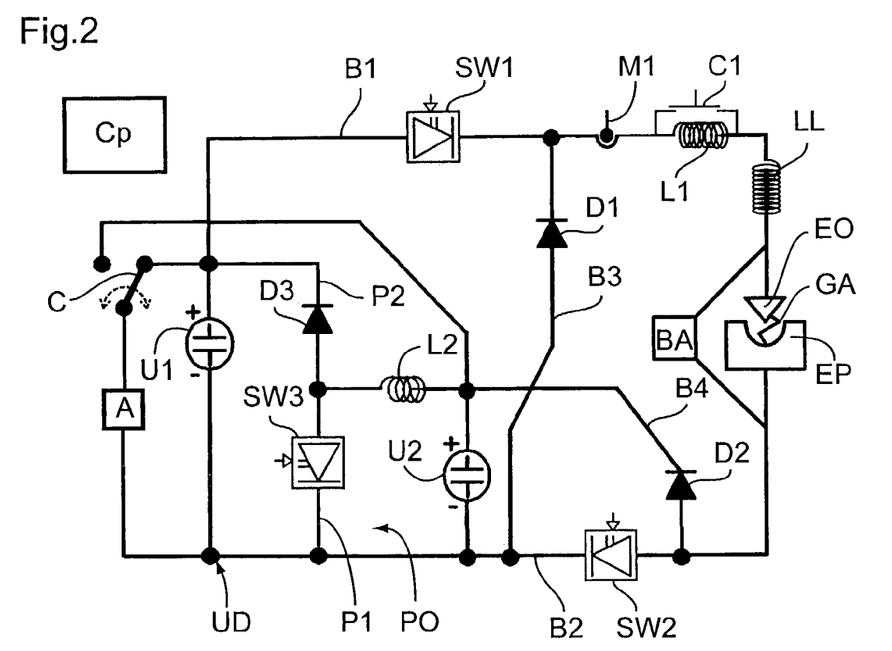
FIGS. 2 to 4 show modifications.

In FIG. 2 is shown a modified embodiment of the first embodiment.

This modification differs from the latter solely by the arrangement to exchange energy between the two sources or current pump PO. This latter is here simplified and carried out thanks to the direct connection of only three components, namely, the diode D3, the winding L2 and the switch SW3 forming the two loops P1 with the switch SW3 and P2 with the diode D3. The direct energy transfer between the two sources thus can be effected only in a single direction, from the source U2 toward the source U1.

To effect transfer in the other direction, it is possible to use the indirect storage of energy in the line inductance LL and in the winding L1 in series with the gap, by causing the current to circulate in paths No. 2, slow increase and No. 3 rapid descent passing through the source U2 in reverse. Despite the simplicity of this three-component pump, the two sources U1 and U2 can thus exchange their energies in both directions.

The impulse generator circuit properly so called is identical to that of FIG. 1; its operation and the four current paths No. 1 to No. 4 are thus identical.

Figure 3:
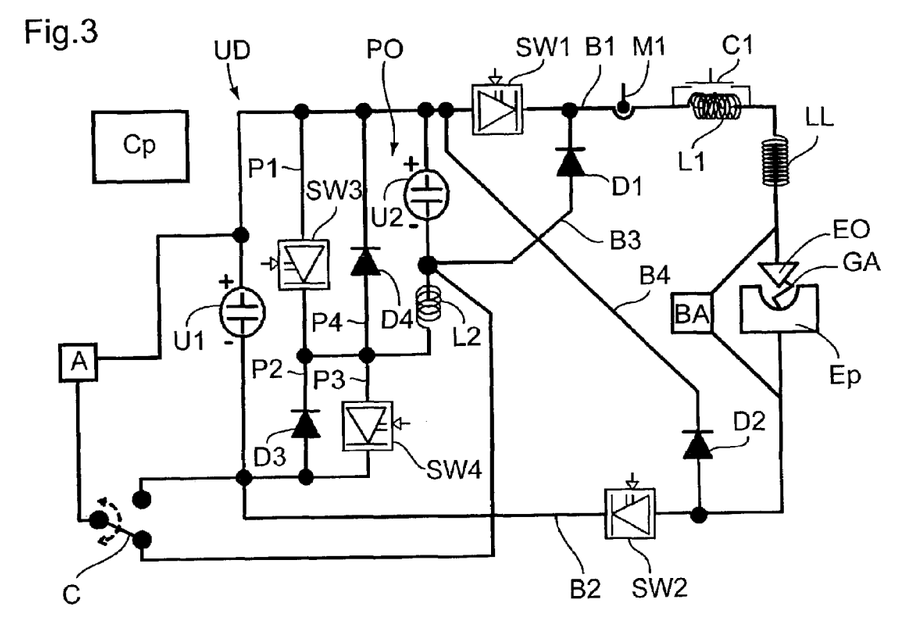
Figure 4:
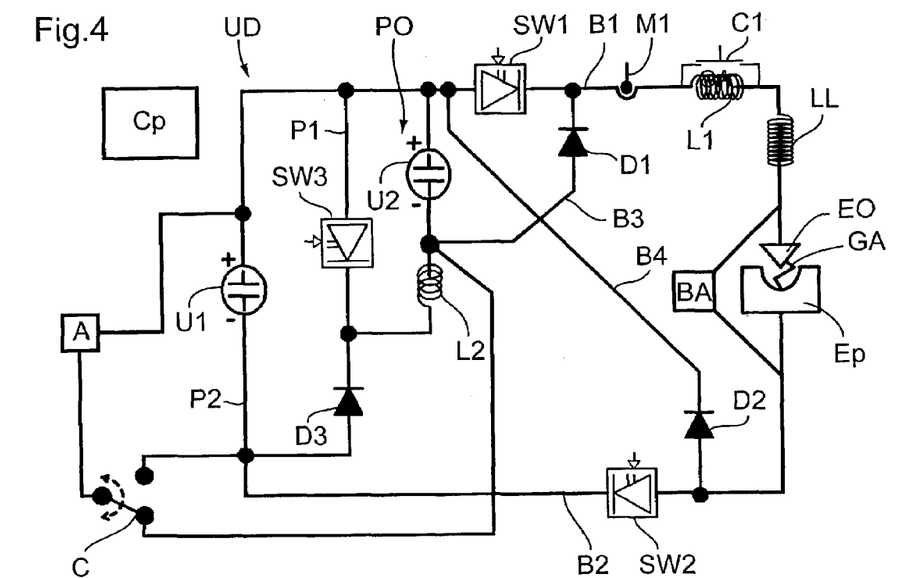

The two modifications shown in FIGS. 3 and 4 have electrical circuits symmetrical to those of FIGS. 1 and 2, the two sources U1 and U2 being however connected by their positive poles to form the double voltage source UD. By means of the commutator C, one or the other of the two sources U1 or U2 can be connected to the supply A.

There can also be identified four branches between the double source UD and the gap GA, namely:
 the branch B1: U1, SW1, M1, L, EO
 the branch B2: EP, SW2, U1
 the branch B3: U2, D1, M1, L, EO
 the branch B4: EP, D2, U2.

The two circuits of FIGS. 3 and 4 also permit producing the four following current paths:
 No. 1) rapid increase: U1, SW1, M1, L(=L1+LL), GA, SW2
 No. 2) slow increase: U1, −U2, D1, M1, L, GA, SW2 (SW1 being blocked)
 No. 3) rapid decrease: L, GA, D2, −U2, D1, M1 (SW1 and SW2 being blocked)
 No. 4) slow decrease: L, GA, D2, SW1, M1 (SW2 being blocked).

The circuit of FIG. 3 comprises a bi-directional current pump PO thus permitting sending electrical charges from the source U2 to the source U1 and vice versa.

This current pump comprises a first loop P1 with U2, SW3, L2 and a second loop P2 with U2, −U1, D3, L2 to transfer the energy of the source U2 toward the source U1, as well as a third loop P3 with U1, −U2, L2, SW4 and a fourth loop P4 with L2, D4, −U2 to transfer energy from the source U1 toward the source U2.

The operation and particularities of the impulse generator circuit properly so called and of the bidirectional current pump of FIG. 3 are identical to those of FIG. 1.

The modified generator shown in FIG. 4 is identical to that of FIG. 3, if only the current pump PO is simplified and comprises solely the first loop P1 with U2, SW3, L2 and the second loop P2 with U2, −U1, D3, L2 to transfer energy from the source U2 toward the source U1.

The transfer of energy from U1 to U2 is obtained by causing current to circulate in paths No. 2, slow increase and No. 3 rapid decrease.

The operation and characteristics of the impulse generator circuit properly so called of the modification of FIG. 4 are identical to those of FIG. 3.

It is to be emphasized that the impulse generator circuits shown in FIGS. 1 to 4 all correspond to half-bridge circuits of which one of the crossed branches B4 or B3 with diode D1 or D2 has been broken to be reconnected in parallel with the adjacent switch SW2 or SW1 by means of the second source U2 to the branch B1 or B2 from which it issues.

Figure 5:
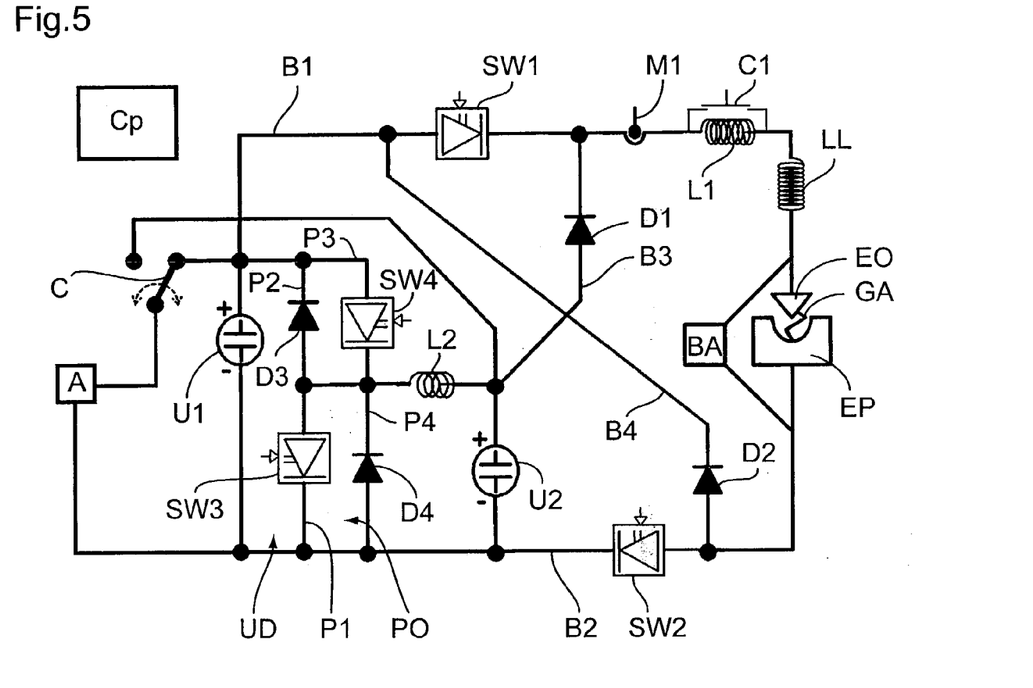
FIG. 5 shows the electrical circuit according to a second embodiment.

The second embodiment shown in FIG. 5 also comprises a half-bridge impulse generator circuit. However, the second source U2 is here integrated into one, B3, of the crossed branches of the half-bridge.

This circuit thus comprises a first branch B1 which connects the double source UD with the first and second source U1, U2 to the gap GA between the electrode-tool EO and the electrode-workpiece EP and which comprises the first switch SW1, the ammeter M1, the self-inductance coil L1 whose terminals are connected by the commutator C1 and the line inductance LL.

The circuit has a second branch B2 with the switch SW2 connecting the electrode-workpiece EP to the negative terminals common to the two sources U1, U2, a third branch B3 with the diode D1, the ammeter M1 and the coil L1 with its shunt C1 and a fourth branch B4 with the diode D2.

The two switches SW1 and SW2 permit producing the following current paths:

No. 1) rapid increase: U1, SW1, M1, L(=L1+LL), GA, SW2.

$$\text{with a current slope } di/dt=(U1-Ug)/L \quad (5).$$

No. 2) slow increase: U2, D1, M1, L, GA, SW2 (SW1 being blocked).

$$\text{with a current slope } di/dt=(U2-Ug)/L \quad (6)$$

No. 3) rapid decrease: L, GA, D2, −U1, U2, D1, M1 (SW1 and SW2 being blocked)

$$\text{with a current slope } di/dt=(U2-U1-Ug)/L \quad (7)$$

No. 4) slow decrease: L, GA, D2, SW1, M1 (SW2 being blocked)

$$\text{with a current slope } di/dt=-Ug/L \quad (8)$$

There are thus obtained two different slopes of current increase and two different slopes of current decrease. The excess inductance energy of the circuit, not consumed by erosive discharges, is returned to the double source UD, here in particular to the source U1 during rapid decrease by following current path No. 3). A bi-directional current pump PO permits exchanging the energy between the source U1 and U2 and vice versa. The construction and operation of this pump are identical to those of the pump of FIG. 1.

When in this second embodiment the first source U1 is connected to the supply, the second source U2 can be charged only by the operation of the current pump PO.

Figure 6:
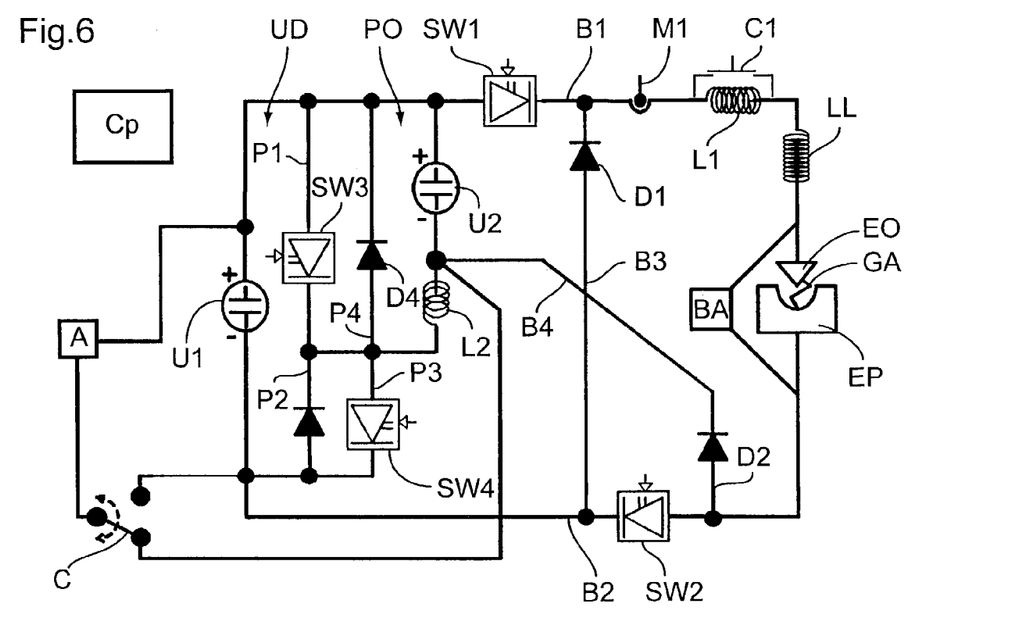
FIG. 6 shows a modification of the second embodiment.

The generator shown in FIG. 6 constitutes a modification of the embodiment of FIG. 5 because its circuit is symmetrical to that of FIG. 5, the two sources U1 and U2 being in this case connected by their positive terminals to form the double voltage source Ud. One or the other of the sources U1 or U2 can be connected to the supply A thanks to the commutator C.

The circuit of FIG. 6, varying symmetrically from that of FIG. 5, permits producing the four current paths and the four current slopes as follows:

No. 1) rapid increase: U1, SW1, M1, L, GA, SW2.

$$di/dt=(U1-Ug)/L \quad (5)$$

No. 2) slow increase: U2, SW1, M1, L, GA, D2 (SW2 being blocked)

$$di/dt=(U2-Ug)/L \quad (6)$$

No. 3) rapid decrease: L, GA, D2, U2, −U1, D1, M1 (SW1 and SW2 being blocked)

$$di/dt=(U2-U1-Ug)/L \quad (7)$$

No. 4) slow decrease: L, GA, SW2, D1, M1 (SW1 being blocked)

$$di/dt=Ug/L \quad (8)$$

The slopes of the two increases and decreases of the circuit of FIG. 6 are thus identical to those of the circuit of FIG. 5.

The current pump PO, which is bi-directional, is identical to that described with reference to FIG. 3. It permits in particular sending electrical charges from the source U1 toward the source U2 which can be charged only by operation of the current pump, when the source U1 is connected to the supply.

In a simplified modification, this current pump of FIGS. 5 and 6 could be unidirectional and could comprise only the components L2, SW4 and D4 to transfer the charges from the source U1 to the source U2.

Figure 7:
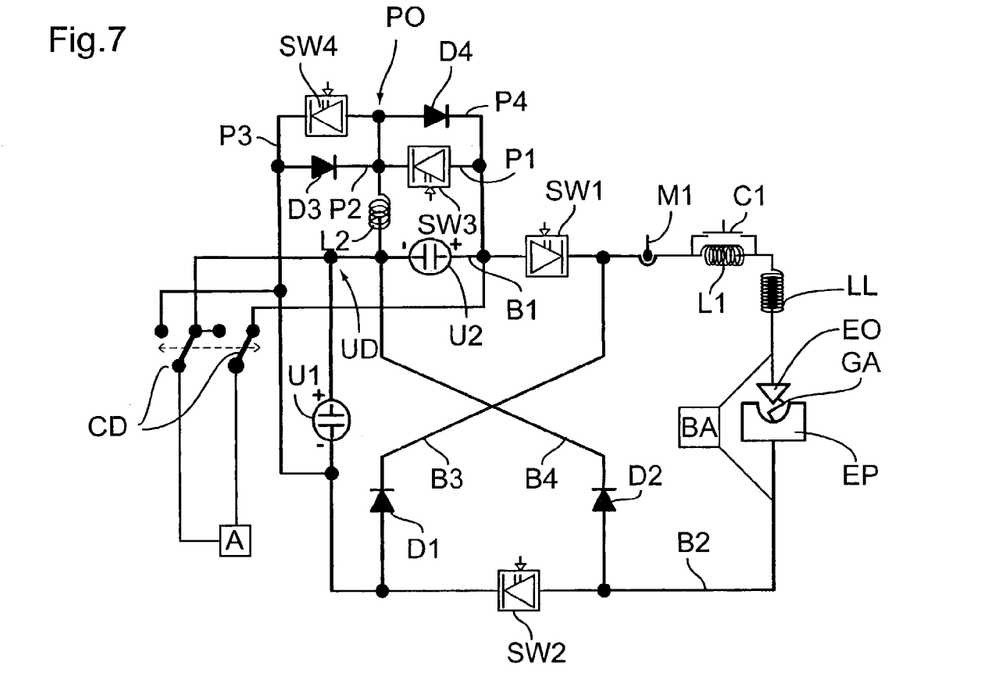
FIG. 7 shows the electrical circuit of a third embodiment.

A third embodiment shown in FIG. 7 comprises a double source UD of voltage comprising a first source U1 whose positive terminal is connected in series to the negative terminal of a second source U2.

One or the other of the two sources U1 or U2 can be connected to the supply A thanks to the double commutator CD.

This embodiment thus has the following branches:
a first branch B1: U1, U2, SW1, M1, L(=L1+LL), EO;
a second branch B2: EP, SW2, U1,
a third branch B3: U1, D1, M1, L, EO,
a fourth branch B4: EP, D2, U1

These four branches with their switching means SW1, SW2 permit producing four paths with four current slopes, namely:

No. 1) rapid increase: U1, U2, SW1, M1, L, GA, SW2

$$di/dt=(U1+U2-Ug)/L \quad (9)$$

No. 2) slow increase: U2, SW1, M1, L, GA, D2 (SW2 being blocked)

$$di/dt=(U2-Ug)L \quad (10)$$

No. 3) rapid decrease: L, GA, D2, −U1, D1, M1 (SW1 and SW2 being blocked)

$$di/dt=(-U1-Ug)/L \quad (11)$$

No. 4) slow decrease: L, GA, SW2, D1, M1 (SW1 being blocked)

$$di/dt=-Ug/L \quad (12)$$

The excess inductance energy of the circuit is returned to the source U1 during rapid decrease.

A bi-directional current pump PO permits exchanging the charges between the two sources U1 and U2. For this purpose it comprises a first loop P1 with SW3 and L2 and a second loop P2 with L2 and D3 to transfer the energy from the source U2 to the source U1 and a third loop P3 with SW4 and L2 and a fourth loop P4 with L2 and D4 to transfer the energy of the source U1 toward the source U2.

Figure 8:
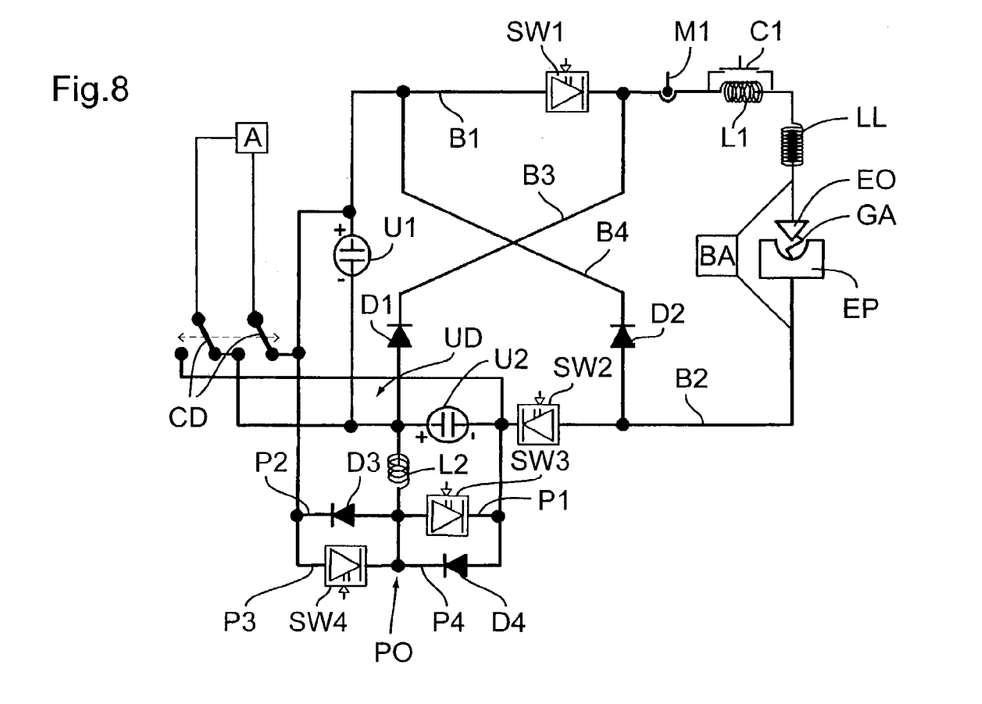
FIGS. 8 to 10 show three modifications of the third embodiment.

The generator shown in FIG. 8 is a symmetrical variation of that of FIG. 7. This variation is distinguished by the fact that the second source U2 is connected by its positive terminal to the negative terminal of the first source U1. As to the rest of the characteristics, the operation and current slopes obtained are similar to those of the generator of FIG. 7. The sequence of actuation of the switches S1 and S2 can be deduced without trouble by those skilled in the art.

Figure 9:
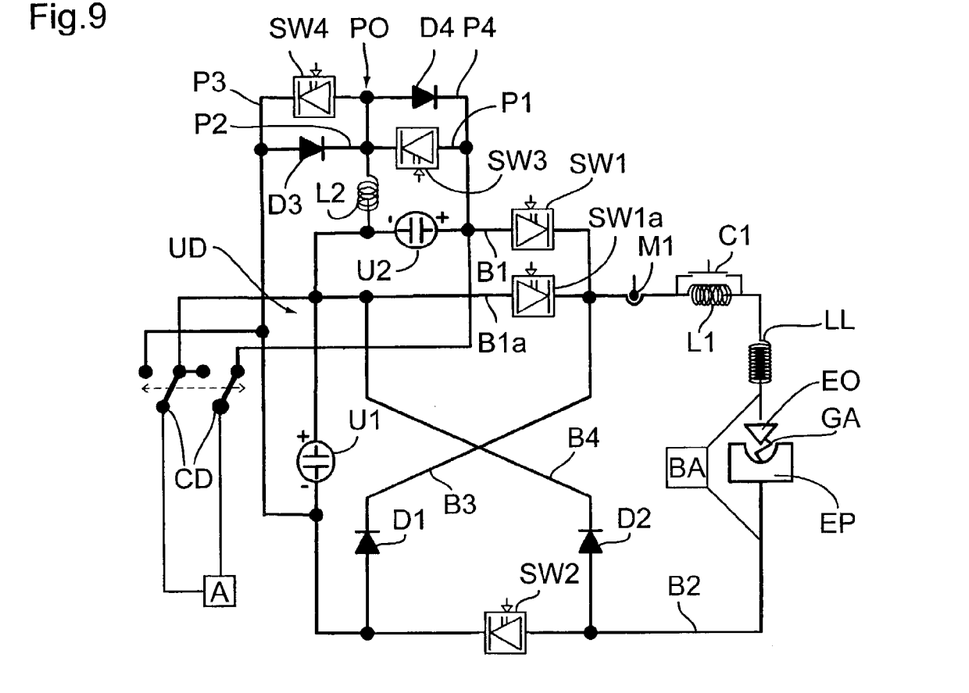

The embodiment shown in FIG. 9 is identical to that of FIG. 7 apart from the presence of a supplemental branch B1a comprising a switch SW1a connected in parallel between the negative terminal of the second source U2 and the output of switch S1. Thanks to this supplemental branch B1a, it is possible to obtain a supplemental current path, namely:

No. 1a) intermediate increase: U1, SW1a, M1, L, GA, SW2 (SW1 being blocked)

$$di/dt=(U1-Ug)/L \qquad (11)$$

The slope of this path is thus intermediate that of the current paths No. 1) and No. 2) of the third embodiment of FIG. 7.

Figure 10:
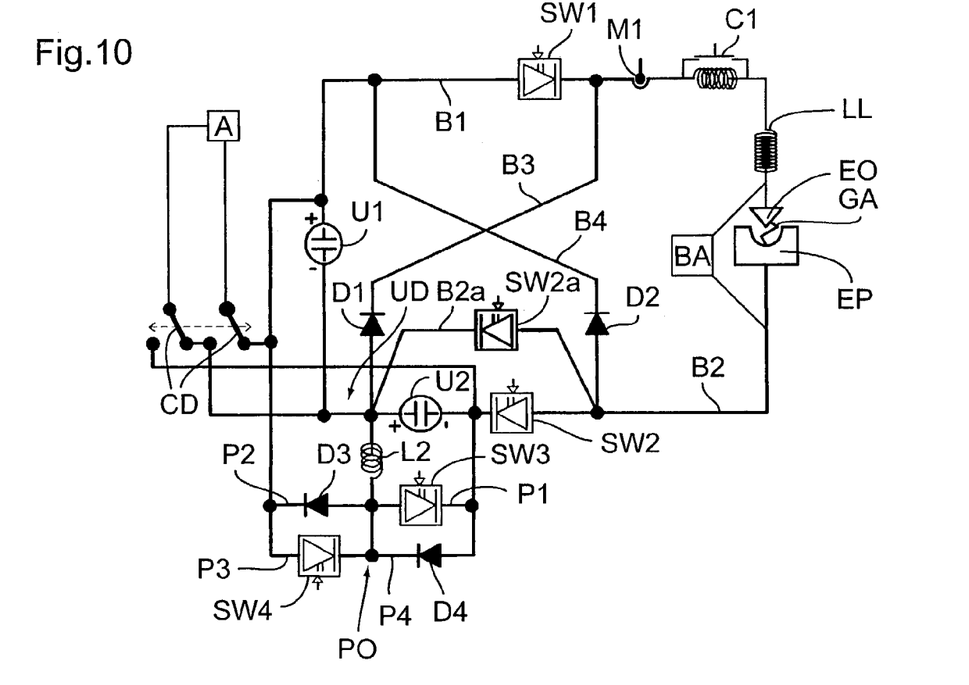

The modification shown in FIG. 10 corresponds symmetrically to the embodiment of FIG. 9. It has a supplemental branch B2a with a switch SW2a connected in parallel between the input of the switch SW2 and the positive terminal of the second source U2. Thanks to this supplemental branch, there is also obtained an intermediate increase U1, SW1, M1, L, GA, SW2a (SW2 being blocked) $di/dt= (U1-Ug)/L$ (11).

Moreover, this modification corresponds to the modification of FIG. 8, apart from the supplemental branch B2a.

Of course the embodiments and modifications described above are in no way limiting and can be the subject of all desirable modifications within the scope defined by claim 1. In particular, the circuits could have more than four or five branches permitting further increase of variation of the slopes of the currents, but this to the detriment of simplicity of the device sought by the present application.

Other electronic and control components could be added to the circuits described such as an anti-short circuit device. According to the uses, the current pumps of FIGS. 5 to 10 could be of the unidirectional type. These current pumps could have a different electronic circuit.

What is claimed is:

1. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles, said double source (UD) being connected to the load circuit by at least four separate branches (B1 to B4), switching means to produce by selective connection of said branches, at least two slopes of increasing current and at least two slopes of decreasing current, said branches being arranged such that the excess self-induction energy of the electrical circuit not consumed by the erosive discharges will be returned to the double source (UD), transfer means (PO) being provided to effect a transfer of energy between the two voltage sources (U1, U2) of the double source (UD), and elements (C) to connect either the first (U1) or the second (U2) voltage source to the supply network (A).

2. The device of claim 1, wherein the electrical circuit is of general half-bridge construction comprising:

a first branch (B1) connecting a positive pole of the double source (UD) by a first switch (SW1) to the working gap (GA), a second branch (B2) connecting the working gap (GA) by a second switch (SW2) to a negative pole of the double source (UD), a third branch (D3) connecting by means of a first unidirectional element (D1) the double source (UD) to a first terminal of the first switch (SW1) directed on the side of the working gap (GA), and a fourth branch (B4) connecting by means of a second unidirectional element (D2) a first terminal of the second switch (SW2) directed on the side of the working gap (GA) to the double source (UD).

3. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles, said double source (UD) being connected to the load circuit by at least four separate branches (B1 to B4), switching means to produce by selective connection of said branches, at least two slopes of increasing current and at least two slopes of decreasing current, said branches being arranged such that the excess self-induction energy of the electrical circuit not consumed by the erosive discharges will be returned to the double source (UD), and transfer means (PO) being provided to effect a transfer of energy between the two voltage sources (U1, U2) of the double source (UD), wherein, the electrical circuit is of general half-bridge construction comprising a first branch (B1) connecting a positive pole of the double source (UD) by a first switch (SW1) to the working gap (GA), a second branch (B2) connecting the working gap (GA) by a second switch (SW2) to a negative pole of the double source (UD), a third branch (B3) connecting by means of a first unidirectional element (D1) the double source (UD) to a first terminal of the first switch (SW1) directed on the side of the working gap (GA), and a fourth branch (B4) connecting by means of a second unidirectional element (D2) a first terminal of the second switch (SW2) directed on the side of the working gap (GA) to the double source (UD), the first and second voltage sources (U1, U2) are connected to each other by their poles of the same polarity, forming a common pole, and one pole of the second source (U2) not connected to the first source (U1) is connected by means of one of the unidirectional elements (D2, D1) to the first terminal of the switch (SW1, SW2) whose other terminal is connected to the common pole of the two sources to form said third or fourth branch (D3, B4).

4. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles, said double source (UD) being connected to the load circuit by at least four separate branches (B1 to B4), switching means to produce by selective connection of said branches, at least two slopes of increasing current and at least two slopes of decreasing current, said branches being arranged such that the excess self-induction energy of the electrical circuit not consumed by the erosive discharges will be returned to the double source (UD), and transfer means (PO) being provided to effect a transfer of energy between the two voltage sources (U1, U2) of the double source (UD), wherein, the electrical circuit is of general half-bridge construction comprising a first branch (B1) connecting a positive pole of the double source (UD) by a first switch (SW1) to the working gap (GA), a second branch (B2) connecting the working gap (GA) by a second switch (SW2) to a negative pole of the double source (UD), a third branch (B3) connecting by means of a first unidirectional element (D1) the double source (UD) to a first terminal of the first switch (SW1) directed on the side of the working gap (GA), and a fourth branch (B4) connecting by means of a second unidirectional element (D2) a first terminal of the second switch (SW2) directed on the side of the working gap (GA) to the double source (UD), the first and second voltage sources (U1, U2) are connected to each other by their poles of the same polarity, forming a common pole, and one pole of the second source (U2) not connected to the first source (U1) is connected by means of one of the unidirectional elements (D1, D2) to the first terminal of the switch (SW1, SW2) of which a second terminal is connected to the pole of the first source (U1) which is not common to the second source (U2) to form said third or fourth branch.

5. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles, said double source (UD) being connected to the load circuit by at least four separate branches (B1 to B4), switching means to produce by selective connection of said branches, at least two slopes of increasing current and at least two slopes of decreasing current, said branches being arranged such that the excess self-induction energy of the electrical circuit not consumed by the erosive discharges will be returned to the double source (UD), transfer means (PO) being provided to effect a transfer of energy between the two voltage sources (U1, U2) of the double source (UD), wherein, the electrical circuit is of general half-bridge construction comprising a first branch (B1) connecting a positive pole of the double source (UD) by a first switch (SW1) to the working gap (GA), a second branch (B2) connecting the working gap (GA) by a second switch (SW2) to a negative pole of the double source (UD), a third branch (B3) connecting by means of a first unidirectional element (D1) the double source (UD) to a first terminal of the first switch (SW1) directed on the side of the working gap (GA), and a fourth branch (B4) connecting by means of a second unidirectional element (D2) a first terminal of the second switch (SW2) directed on the side of the working gap (GA) to the double source (UD), the first and second sources (U1, U2) are connected to each other by their poles of opposed polarity and by the fact that the second source (US) is connected in series in the first or second branch (B1, B2) to a second terminal of one of the switches (SW1, SW2) directed toward the first source (U1).

6. The device of claim 5, wherein, the electrical circuit comprises, connected in parallel with the second source (U2) and the switch (SW1, SW2) connected to this second source (U2), a supplemental switch (SW1a, SW2a) which is connected on one side to the common poles of the first and second sources (U1, U2) and on the other side to the first terminal of this switch (SW1, SW2) directed on the side of the working gap (GA).

7. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles, said double source (UD) being connected to the load circuit by at least four separate branches (B1 to B4), switching means to produce by selective connection of said branches, at least two slopes of increasing current and at least two slopes of decreasing current, said branches being arranged such that the excess self-induction energy of the electrical circuit not consumed by the erosive discharges will be returned to the double source (UD), and transfer means (PO) being provided to effect a transfer of energy between the two voltage sources (U1, U2) of the double source (UD), wherein, said transfer means (PO) comprise a first transfer circuit arranged to transfer the energy of the second source (U2) to the first source (U1) and by the fact that this first transfer circuit comprises, on the one hand, a first current loop (P1) comprised by an energy accumulator (L2), a third switch (SW3) and a second source (U2) and, on the other hand, a second current loop (P2) comprising at least said energy accumulator (L2), a third unidirectional element (D3) and the first source (U1) mounted as an energy receiver, the first and second loops (P1, P2) being actuated alternatively by the closing and opening of the third switch (SW3).

8. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles,     said double source (UD) being connected to the load circuit by at least four separate branches (B1 to B4),     switching means to produce by selective connection of said branches, at least two slopes of increasing current and at least two slopes of decreasing current,     said branches being arranged such that the excess self-induction energy of the electrical circuit not consumed by the erosive discharges will be returned to the double source (UD), and     transfer means (PO) being provided to effect a transfer of energy between the two voltage sources (U1, U2) of the double source (UD), wherein,     said transfer means (PO) comprise a second transfer circuit arranged to transfer the energy of the first source (U1) toward the second source (U2) and by the fact that this second transfer circuit comprises, on the one hand, a third current loop (P3) comprising at least one energy accumulator (L2), a fourth switch (S4) and the first source (U1) and, on the other hand, a fourth current loop (P4) comprised by said energy accumulator (L2), a fourth unidirectional element (D4) and a second source (U2) mounted as an energy receiver, the third and fourth loops (P3, P4) being actuated simultaneously by the closing and opening of the fourth switch (SW4).

9. Device for machining by electroerosion, comprising an electrical circuit with a voltage source (U1, U2) connected to a supply network (A), arranged to produce current impulses in a load circuit comprising an electrode-tool (EO) and an electrode-workpiece (EP) constituting opposite poles of a working gap (GA) in series with at least one self-induction element (L1, LL), the electrical circuit comprising:

a double voltage source (UD) comprising a first (U1) and a second (U2) voltage source connected galvanically together by one of their poles,     said double source (UD) being connected to the load circuit by at least four separate branches (B1 to B4),     switching means to produce by selective connection of said branches, at least two slopes of increasing current and at least two slopes of decreasing current,     said branches being arranged such that the excess self-induction energy of the electrical circuit not consumed by the erosive discharges will be returned to the double source (UD), and transfer means (PO) being provided to effect a transfer of energy between the two voltage sources (U1, U2) of the double source (UD), wherein, said transfer means (PO) comprise a first transfer circuit arranged to transfer the energy of the second source (U2) to the first source (U1) and by the fact that this first transfer circuit comprises, on the one hand, a first current loop (P1) comprised by an energy accumulator (L2), a third switch (SW3) and a second source (U2) and, on the other hand, a second current loop (P2) comprising at least said energy accumulator (L2), a third unidirectional element (D3) and the first source (U1) mounted as an energy receiver, the first and second loops (P1, P2) being actuated alternatively by the closing and opening of the third switch (SW3), and said transfer means (PO) comprise a second transfer circuit arranged to transfer the energy of the first source (U1) toward the second source (U2) and by the fact that this second transfer circuit comprises, on the one hand, a third current loop (P3) comprising at least one energy accumulator (L2), a fourth switch (S4) and the first source (U1) and, on the other hand, a fourth current loop (P4) comprised by said energy accumulator (L2), a fourth unidirectional element (D4) and a second source (U2) mounted as an energy receiver, the third and fourth loops (P3, P4) being actuated simultaneously by the closing and opening of the fourth switch (SW4), said energy accumulator (L2) is common to the first and second transfer circuits.

\* \* \* \* \*